Feb. 18, 1969    L. A. CHERMELY    3,428,301
LIFTING ARRANGEMENT FOR A FURNACE FUME ELBOW AND THE LIKE
Filed Oct. 2, 1967

INVENTOR
Leslie A. Chermely
BY

HIS ATTORNEYS

United States Patent Office 3,428,301
Patented Feb. 18, 1969

3,428,301
LIFTING ARRANGEMENT FOR A FURNACE FUME ELBOW AND THE LIKE
Leslie A. Chermely, Pittsburgh, Pa., assignor to Pullman Incorporated, a corporation of Delaware
Filed Oct. 2, 1967, Ser. No. 672,321
U.S. Cl. 263—46
Int. Cl. F27d 1/02
12 Claims

ABSTRACT OF THE DISCLOSURE

A lifting arrangement is disclosed for lifting and suspending the smoke or fume elbow of an electric melt furnace or the like. The elbow is raised above the furnace during those times when the furance roof is periodically replaced with a new roof. On the other hand, the elbow is suspended at (or slightly above for draft purposes) the roof during operation of the furnace. The elbow lift is coupled to the roof lift for simultaneously lifting the elbow and the roof when the latter is raised and swung aside for changing purposes. The disclosed mechanism, however, lifts the elbow slightly faster and farther than the roof so that the raised roof clears both the top of the furnace and the lower end of the elbow when the roof and the elbow are pivoted to one side. The lifting mechanism transposes all of the considerable elbow weight to the pivotable roof supporting beams so that neither the roof nor the roof-supporting ring of the furnace need be assymetrically strengthened to support the elbow. Thus the very heavy elbow can be supported entirely by the roof beams during operation of the furnace as well as during roof changing or furnace charging.

---

The present invention relates to a handling device, and more particularly to a lifting arrangement for the fume elbow, or the like large fitting or fittings associated with the roof of a large industrial furnace. Exemplarily, the lifting arrangement is described in connection with the smoke elbow of a large, electric, steel-melting furnace.

In the steel industry large electric arc furnaces are used for melting and refining steel scrap. This type of electric arc furnace is of the order of 20 feet or more in diameter of 200 tons or more in capacity. The furnace is basically a melting vessel which is refractory lined and equipped with openings such as a spout, doors, electrode holes, etc. The melting vessel is covered with a refractory roof wherein the refractory material is contained by a pre-fabricated steel roof ring. The roof ring is supported by heavy support beams which are extended over the top of the furnace. The support beams usually are cantilevered to a platform or other supporting structure which is pivotally mounted adjacent the furnace vessel. During the furnace charging operation the roof is lifted up to, or along with, the support beams (depending on type of furnace), and off the top of the furnace vessel. The roof is then in a position to be swung aside by the support beams of the aforementioned pivot structure to permit charging thru the top opening of the furnace.

During the melting process large quantities of smoke, dust, fume and other foreign matter are generated in the furnace, which can escape to contaminate the surrounding atmosphere. In order to prevent contamination of the atmosphere various kinds of smoke, dust, fume and other foreign matter which is usually measurable in tons per day, collecting equipment has been developed for electric arc melting furnaces. For example, partial or full hoods, canopies, and a type of ductwork equipment can be attached to the roof of the furnace. This latter type equipment exhausts smoke, dust, fume and foreign matter through a hole in the roof of the furnace to a collecting system. The ductwork and its attachment to the furnace roof is made through a fitting usually referred to as a "fume elbow." The elbow for different sizes of furances may vary from 4 ft. to 6 ft. in diameter. It is usually jacketed for water cooling and weighs between 15,000 and 20,000 lbs.

In one type electric arc furnace the furnace roof is lifted up to the support beams by cables while the support beams remain stationary. The support beams together with the roof can then be swung or pivoted to one side. With this type of furnace a fume elbow is conventionally supported from the roof ring. The bulk and weight of the elbow renders an asymmetrical loading to the roof ring causing design problems in constructing both the roof ring and the furnace roof. In addition, when replacement of the roof is required, the fume elbow and the supporting structure must be completely removed from the furnace roof ring including water connections and draining of the elbow jacket. The roof removal therefore entails additional labor, time and inconvenience.

In another type of electric arc furnace, the furnace roof ring is attached directly to the support beams. When the support beams are raised or lowered or swung aside, the roof moves with the support beams. If this type of furnace is equipped with a fume elbow, the elbow can be attached directly to the support beams and not the roof ring. The disadvantage in this case is that the elbow cannot be readily moved relative to the roof for controlling the amount of draft in the exhaust duct, when it is desirable to support the elbow in some manner from the support beams to avoid disconnecting. However, the elbow must be disconnected from the cooling water conduits on the support beams each time the furnace roof is removed for replacement.

I overcome these disadvantages of the prior art by providing a lifting arrangement, which permanently engages and supports the fume elbow at various elevations as required during the operation and maintenance of the furnace. My novel lifting arrangement for the furnace elbow and roof desirably is mounted on supporting beams which in turn are supported for pivotal roof movement at a fixed elevation. The lifting arrangement for the elbow, then can be actuated by the same means normally provided on such furnace roof supporting beams for raising the furnace roof, when the beams and the roof are pivoted aside. The lifting arrangement raises the elbow slightly faster or farther than the furnace roof to provide a clearance between the lower end of the elbow in its raised position and the adjacent surface of the furnace roof in its raised position to prevent accidental damaging contact therebetween when the roof is changed for maintenance or swung aside for charging purposes. The elbow or other fitting, however, remains suspended in a raised position directly over its engaged position relative to the roof beams so that the water connections carried thereby need not be disengaged from the elbow. With my novel lifting arrangement the furnace roof can be replaced when worn out within a much shorter time and with less labor and hoisting equipment.

Equally important, my novel elbow lift bears the total weight of the elbow at all times to eliminate the possibility of damage to the masonry roof and to obviate the provisions of separate supporting means such as a strengthened roof ring. Since the elbow and the novel lift therefor can be moved with the roof supporting means, there is no need for disconnecting cooling water connections to the elbow, during replacement of the roof when the roof is temporarily swung aside. The distance at which the elbow is supported by my novel lift above the roof outlet fitting can be readily varied to change the amount of draft available at the elbow. Alternatively, the elbow can be lowered into non-bearing contact with the roof fitting substantially to eliminate any external draft.

I accomplish these desirable results by providing a lifting mechanism for a fume elbow and the like fitting of a furnace roof, said arrangement comprising a pair of pivoted levers mounted above said furnace roof, a supporting structure secured to said fume elbow and to the adjacent ends of said levers respectively, and means for pivoting said levers to raise said fume elbow to an inactive position spaced above said furnace to permit movement of said furnace roof without damage to said elbow and to a lowered operating position in relation to a fume opening in said roof when said roof is mounted on said furnace.

I also desirably provide a similar mechanism wherein means are coupled to said lifting mechanism for adjustably juxtaposing said elbow to said fume opening for regulating the draft thereat.

I also provide a lifting mechanism for a furnace roof and a fume elbow or the like fitting associated therewith, said mechanism including pivoted roof-supporting structure spacedly mounted above said furnace roof, first lifting means mounted on said supporting structure and engaged with said elbow for raising and lowering said elbow, second lifting means mounted on said supporting structure for raising and lowering said furnace roof, and means coupling said first lifting means to said second lifting means so that said elbow and said roof are raised simultaneously by said first and said second lifting means respectively.

I also desirably provide a similar mechanism wherein said lifting mechanism is so coupled to said roof lifting means that said elbow is lifting slightly farther than said furnace roof to provide clearance for removing said roof for maintenance and furnace-charging purposes.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
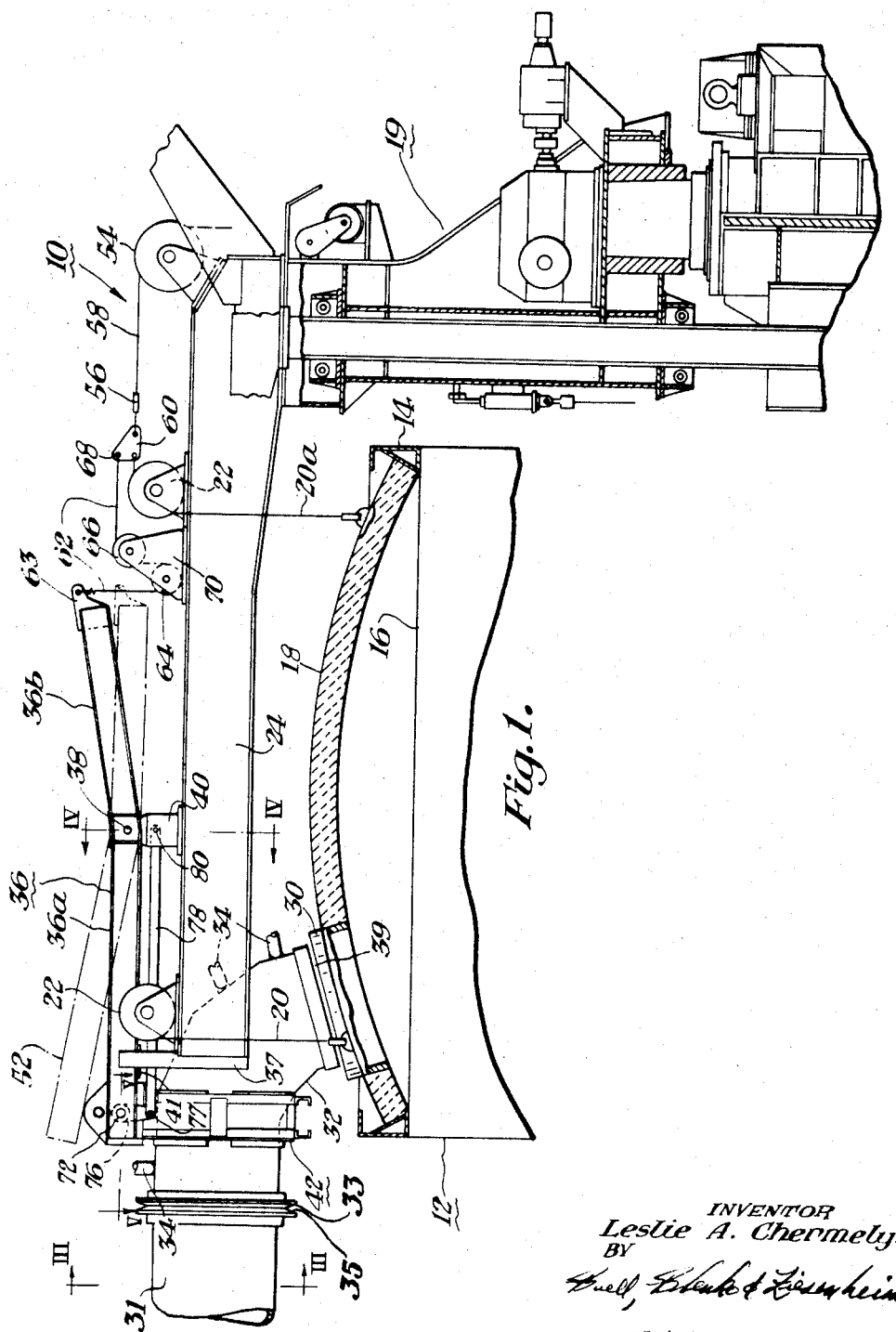
FIGURE 1 is a side elevation view of my novel lifting mechanism showing the components in their lowered positions.

Referring now more particularly to the drawings, and initially to FIGURE 1 thereof, the exemplary supporting and lifting mechanism 10 of the invention is arranged for use in this example with a large electric furnace 12. The furnace 12 is provided with a generally circular roof engaging ring 14 which conforms generally to the upper opening 16 of the furnace 12. As described below, the lifting mechanism 10 is employed for supporting and for the raising and lowering of both the furnace roof 18 and the fume elbow or other fitting 32, described below. The lifting mechanism is pivotally mounted as denoted by reference character 19 (FIGURE 1) to permit removal of the furnace roof 18 for maintenance or changing purposes.

In this arrangement a roof or hood 18 for the furnace 12 is raised and lowered relative to its engaged position with the roof ring 14 by a plurality of cables 20 and pulleys 22. The term "cable" as used herein, is inclusive of any suitable flexible coupling, such as chain or stranded wire. As better shown in FIGURE 2, four such pulleys 22 are employed although a different number can be used.

In the example the pulleys 22 are grouped in pairs respectively upon a pair of spaced roof-supporting beams 24, which in turn are supported at fixed locations above the furnace roof 18 by suitable conventional pivot structures denoted generally at 19.

Figure 2:
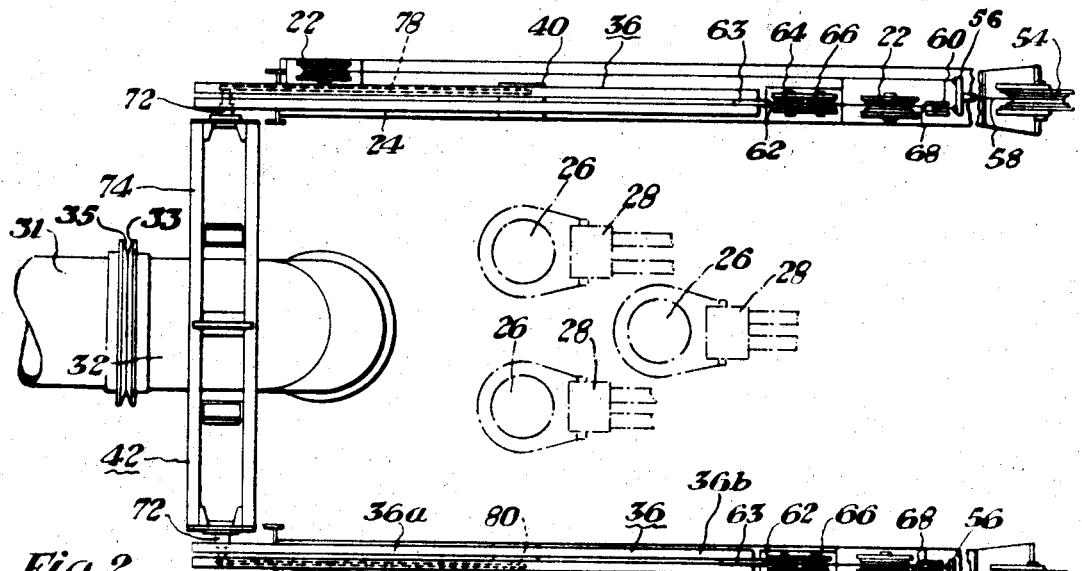
FIGURE 2 is a top plan view of the apparatus as shown in FIGURE 1.

The furnace roof 18 in this example is conventionally provided with polyphase electrodes 26 which are slidably inserted into closely fitting apertures therefor in the furnace roof 18 as denoted in FIGURE 2. Suitable electrical connectors 28 are secured individually to the electrodes 26 and are connected to a source (not shown) of operating potential. The furnace roof 18 also conventionally is provided with a large through fitting 30 to which an appropriately sized smoke or fume elbow 32 is detachably connected in the conventional manner.

The elbow 32 and the adjacent outlet ductwork 31 are provided with oppositely beveled flanges 33 and 35 respectively. The flanges permit a sliding fit (FIGURES 1, 1A and 2) at the operating positions of the fume elbow 32 and permit vertical movement of the elbow 32 to adjust the draft (FIGURES 1, 1A), as described below. The flanges 33, 35 also allow an upward arcuate movement of the elbow 32 when lifting the elbow (FIGURE 1B) prior to swinging the roof 18 and the elbow 32 aside by means of the pivot structure 19.

The elbow 32 also is provided with conventional coolant connections the terminal ends of which are denoted by reference characters 34. Because of the size and weight of the elbow 32 the latter must be raised slightly above the roof 18 as the furnace roof is swung aside by the pivot 19 for furnace maintenance and charging purposes. The charge is then dumped into the furnace opening 16 at which time the elbow 32 and roof 18 are pivoted out of the way. Before swinging the furnace roof 18 the electrodes 26 are, of course, withdrawn by a suitable hoist (not shown).

Because of the size and weight of the fume elbow 32 it is desirable to permanently suspend the elbow directly from the roof supporting means 24 for pivotal movement therewith. Thus, disconnecting the elbow coolant conduits is avoided when the beams are pivoted, as the conduits are desirably carried by the beams 24. This arrangement eliminates the need for supporting the elbow from the roof ring 14 or providing other independent supporting means. As the roof beams 24 are pivoted through a fixed elevation, it is necessary to provide suitable means for raising and lowering the elbow 32 relative to the furnace roof 18 for the purposes mentioned above.

Figure 4:
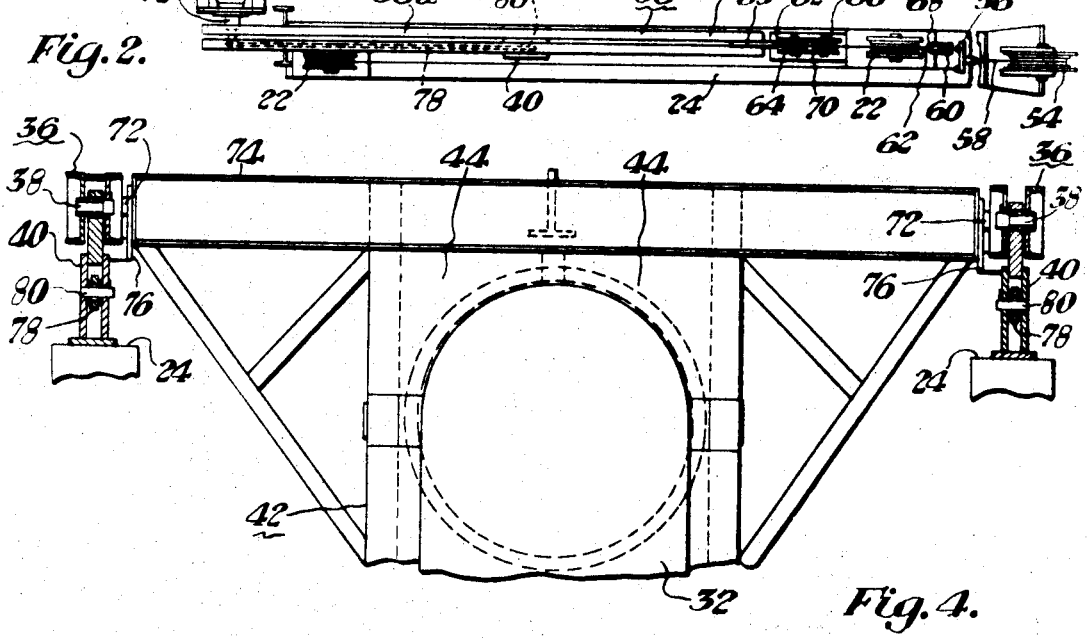
FIGURE 4 is an enlarged, partial, vertically sectioned view of the apparatus as shown in FIGURE 1 and taken along reference line IV—IV thereof.

An exemplary form of a suitable lifting and supporting mechanism for the elbow 32, in accordance with my invention, includes a pair of lifting levers 36 each pivoted respectively by means of fulcrum pin 38 and bracket 40 (FIGURES 1 and 4) to the associated roof-supporting beam 24.

When the furnace 12 is in use the elbow lifting levers 36 norally pivot to their lowered positions (FIGURE 1) owing to their greater frontal weight, as noted below. At the position of the levers 36 a tiltable cradle structure 42 pivotably secured adjacent the front ends of the levers 36 suspends the fume elbow 32 at its operative position, also denoted in FIGURE 1. The cradle structure 42 desirably includes contact members 44 having arcuate surfaces 46 and spaced around the adjacent periphery of the fume elbow 32 for complementary engagement therewith. Each of the roof supporting beams 24 is provided adjacent its front end with a suitable stop member 37 against which the pivoted lifting levers 36 rest in their lowered positions.

The stop members 37 permit the elbow 32 to be lowered into non-bearing contact (not shown) with the permanent roof fitting 30, which defines the fume opening thereof; However, it is desirable to suspend the elbow at a short distance or gap 39 above the fitting 30 to provide suitable draft in this area. The width of the gap 39 and the amount of draft resulting therefrom can be regulated through the use of one or more shims 41 interposed between each of the stops 37 and the respective lever 36. For example, several such shims 41 can be thus utilized, as better shown in FIGURE 1 to widen the gap 39 for increased draft. The parallelism of the elbow 32 and roof fitting 30 is preserved by the pantographic mechanism 76–80 coupled to each lever 36 and described in detail below. The pantographic mechanisms thus ensure a uniform gap 39 between the juxtaposed peripheries of the elbow 32 and the roof fitting 30. When the elbow 32 is lowered into peripheral contact with the fitting 30 to eliminate draft, the aforementioned parallelism assures the absence of any point of bearing contact between the elbow and fitting, which may otherwise damage the roof 18, the elbow 32, or the fitting 30.

Figure 1A:
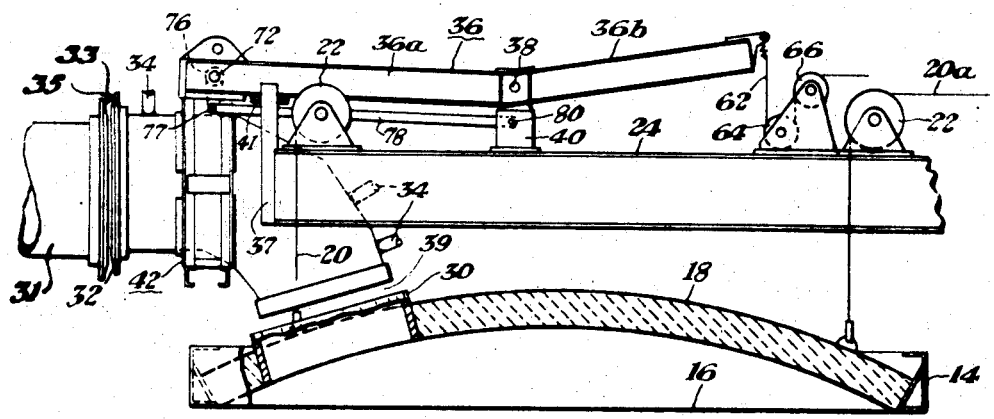
FIGURE 1A is a partial view of the apparatus shown in FIGURE 1 but showing an operative position of the elbow involving increased draft, provided in accordance with another feature of my invention.
Figure 1B:
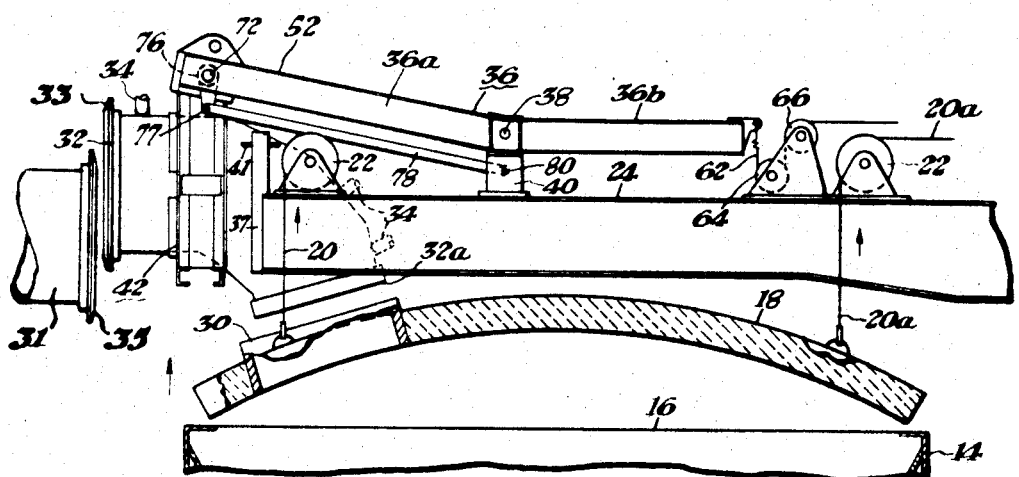
FIGURE 1B is a similar view of the mechanism of the preceding figures but illustrating the lifting components thereof in their raised positions.
Figure 3:
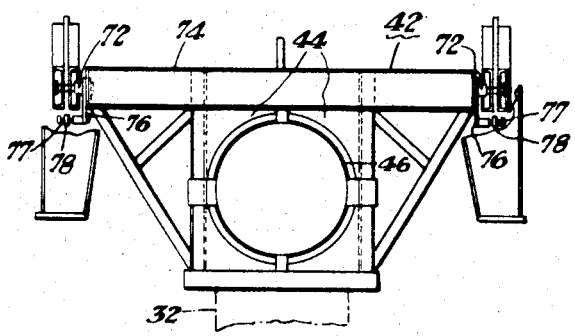
FIGURE 3 is a front elevational view of the apparatus as shown in FIGURE 1.

When it is desired to raise the fume elbow 32 and the roof 18 to their inactive positions, as shown in FIGURE 1B, the levers 36 are pivoted to their upper position, and the cables 20 are raised. The levers 36 are thus pivoted between their lowered positions (FIGURE 1) and their raised positions (FIGURE 1B) by suitable linkages presently to be described. At their raised positions the levers 36 support the fume elbow 32 at a slightly higher raised position than that of the furnace roof 18, as shown in FIGURE 1A, so that the roof 18 in its raised position will clear both the lower end of the raised elbow 32 and the upper edges of the furnace ring 14, when the furnace roof 18 and the elbow 32 are swung aside by the pivoted roof beams 24 for furnace-charging purposes.

More importantly the elbow lifting mechanism 10 and the roof supporting beams 24 permit the elbow 32 to be swung or pivoted aside by the pivot 19 where it will be out of the way during roof changing. At such times the roof 18 is first disconnected from cables 20 and remains on the furnace 12 when the beams 24 and elbow 32 are pivoted aside by the pivot structure 19. The roof 18 is then removed from the top of the furnace 12 by a crane (not shown) or the like, and a new roof substituted therefor. The beams 24 and elbow 32 are then pivoted back to their operating positions and the cables 20 reconnected to the substituted roof. A considerable saving in time is effected during each roof changing sequence by thus obviating a separate handling of the very heavy elbow 32 and eliminating the necessity of disconnecting the aforementioned water connections.

As intimated previously the movement of the lifting levers 36 desirably is controlled by the same means for actuating the cable and pulley arrangements 20–22 to lower and raise the furnace roof 18. In furtherance of this purpose a master pulley 54 is mounted adjacent the end of each of the roof beams 24. The cables 20 passing over pulleys 22 of each beam are connected to cable bracket 56 and thence to master cable 58. However, as better shown in FIGURE 1 the cables 20a of the rear lift pulleys 22 are each connected to an intermediate cable bracket 60 and thence to the aforementioned cable bracket 56.

To permit pivoting of the levers 36 simultaneously with raising the furnace roof 18, a cable 62 or the like is connected to rear end bracket 63 of each lever 36. Each cable 62 passes over and under directional pulleys 64, 66 and thence to its point of securance to upper end 68 of the associated intermediate cable bracket 60. The pulleys 64, 66 associated with each roof beam 24 are rotatably mounted on a support 70 therefor which in turn is mounted in this example, on the upper side of the roof beam 24 adjacent its roof-lifting pulley 22.

With this arrangement it will be seen that the rear ends of the lifting levers 36 are pulled downwardly approximately through the same total distance as the furnace roof 18 is lifted. This follows from the fact that the roof-lifting pulleys 22 and the lever pulleys 64, 66 merely change the direction of their associated cables 20 and 62. However, by placing the fulcrum 38 of each lever 36 to the rear of its midpoint, with relation to the elbow supporting structure or cradle 42 as better shown in FIGURE 1, so that the front end portion 36a of each lever is longer than its rear end portion 36b, the cradle structure 42 and the fume elbow 32 supported thereby are each lifted a slightly greater distance than that through which the roof structure 18 is lifted. The lower end of the fume elbow 32 thus is assured of clearing the adjacent surface of the roof structure 18 including its through fitting 30, as shown in FIGURE 1B. At the same lifted position the roof 18 clears the upper edges of the furnace 12 so that the roof 18 can be swung freely to one side for charging purposes without damage thereto or to the fume elbow 32 or the upper edges of the furnace ring 14. However, the raised position (FIGURE 1A) of the fume elbow is not sufficiently high to require disconnection of the flexible coolant conduits 34 mounted on the pivoted roof beams 24.

As the fume elbow 32 is thus raised and lowered by the lifting and supporting mechanism 10, the pivoted support structure or cradle 42 attached to the forward ends of the levers 36 is pivoted relative to the levers 36 to prevent any actual angular displacement of the elbow 32 as the latter is raised from its operative position (FIGURE 1) to its inactive position (FIGURE 1B). Desirably, novel means according to my invention are provided for positively and angularly displacing the cradle 42 to prevent the elbow's rear edge portion 32a from swinging down as the elbow 32 is lifted. This is desirable not only to prevent the conduit connections 34 from being twisted but also for maintaining a proper clearance between the raised elbow 32 and the raised roof 18. Desirably also the angular displacement thus imparted to the cradle 42 is related to the angular displacement or pivoting of the levers 36 to prevent any actual angular displacement of the elbow 32 at any point in its path of upward movement. This permits the aforedescribed uniform gap 39 (FIGURES 1 and 1A) to be preserved at the operating positions of the elbow 32.

Figure 5:
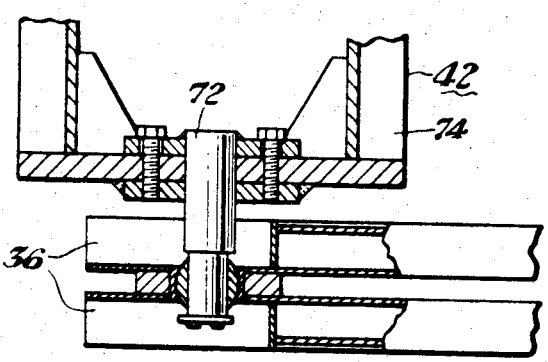
FIGURE 5 is an enlarged, partial, horizontally sectioned view of the apparatus as shown in FIGURE 1 and taken along reference line V—V thereof.

As better shown in FIGURES 1, 1B and 3–5 one arrangement for thus angularly displacing the cradle 42 relative to the lifting levers 36 is shown in detail. In this example the cradle 42 is pivotally joined to the front ends of the levers 36 by means of pivot pins 72, which are rigidly joined to the respective ends of cradle supporting beam 74 and rotatably engaged with the associated ends of the levers 36 as shown in FIGURE 5. Each end of the cradle beam 74 is additionally provided with a crank 76 also rigidly joined thereto. The lower end of each crank is pivotally joined at 77 to the front end of connecting rod 78 (FIGURES 1 and 1B). The other end of each connecting rod 78 is pivotally joined to the fulcrum bracket 40 as denoted by reference character 80. Desirably, the distance between the front connecting rod pivot point 77 and the associated cradle pivot point 72 is equal to the distance between the rear connecting rod pivot point 80 and the lever fulcrum 38. Thus a pantograph is formed by each lever 36, crank 76, connecting rod 78 and fulcrum bracket 40, with the result that the tiltable cradle 42 remains parallel to the plane of the section along reference line IV—IV extending through either connecting rod rear pivot point 80 and associated fulcrum point 38.

As the fume elbow and its supporting cradle 42 are being raised, the aforedescribed pantographic mechanism causes the cradle 42 to be pivoted relative to the lifting levers 36 to the end that the cradle, in this example, remains in a vertical position, as seen from a comparison of FIGURES 1, 1A and 1B, throughout the lifting movement of the levers 36. This prevents the rear edge portion 32a of the elbow 32 from swinging downwardly relative to the remainder of the elbow. Accordingly, a proper clearance is achieved between the elbow 32 in its raised position and the roof 18 in its raised position (FIGURE 1B) with a minimum movement of the front ends of the levers 36.

After replacement of the roof, and/or after the cables 20 are reconnected in the case of roof changing, the furnace roof 18 is swung back to its raised position 52 by pivotal movement of the roof beams 24 and associated components of the pivot mechanism 19. Then, the master cables 58 are payed out from a winch (not shown) or the like to lower the roof 18 to its operative position (FIGURE 1). At the same time the front ends of the levers 36 and the cradle structure 42 pivotally secured thereto are lowered to restore the fume elbow 32 to its juxtaposed operating position near or at the roof fitting 30 are desired. The aforedescribed pantographic structure, of course, moves the elbow without angular displacement from its raised position (FIGURE 1B) to its operating position (FIGURE 1 or 1A) adjacent the roof fitting 30. The controlled pivoting of the cradle 42 eliminates any oscillation or spurious swinging of the cradle 42 and the massive elbow 32.

From the foregoing it will be apparent that novel and efficient forms of lift and support mechanisms for a large furnace fitting and the like and for the combined lifting and supporting of the furnace roof and such fitting have been disclosed herein. While I have shown and described certain presently preferred embodiments of the invention and have illustrated presently preferred methods of practicing the same, it is to be distinctly understood that the invention is not limited thereto but may be variously embodied and practiced.

I claim:

1. A lifting mechanism for a fume elbow and the like fitting of a furnace roof, said arrangement comprising a pair of pivoted levers mounted above said furnace roof, a supporting structure secured to said fume elbow and to the adjacent ends of said levers, and means for pivoting said levers to raise said fume elbow to an inactive position spaced above said furnace to permit movement of said furnace roof without damage to said elbow and to a lowered operating juxtaposition relative to a fume opening in said roof when said roof is mounted on said furnace.

2. The combination according to claim 1 wherein said levers are pivoted respectively to a pair of pivoted beams forming part of a furnace roof supporting and lifting structure spaced above said roof, and means are mounted on said supporting beams for raising and lowering said roof.

3. The combination according to claim 2 wherein said leverd pivoting means are coupled to said roof raising and lowering means such that said elbow is raised slightly farther than said roof is raised to provide clearance therebetween.

4. The combination according to claim 3 wherein said roof raising and lowering means include a plurality of pulley and cable arrangements, the adjacent end of each of said levers being connected to an adjacent one of said cables for simultaneously pivoting said levers with movement of said adjacent supporting cables.

5. The combination according to claim 4 wherein the lever-to-cable connections include additional pulley and cable arrangements, and all of the cables associated with each of said supporting beams are connected to a master pulley and cable arrangement for simultaneous actuation of said levers and of said roof raising and lowering means.

6. The combination according to claim 3 wherein said levers are each pivoted beyond their midpoints relative to the securance of said elbow supporting structure so that said roof supporting structure, the adjacent end of said and to a greater distance than said furnace roof.

7. A lifting mechanism for a furnace roof and a fume elbow or the like fitting associated therewith, said mechanism including pivoted roof-supporting structure spacedly mounted above said roof, first lifting means mounted on said supporting structure and engaged with said elbow for raising and lowering said elbow, second lifting means mounted on said supporting structure for raising and lowering said furnace roof, lifting means so that said elbow and said roof are raised simultaneously by said first and said second lifting means respectively.

8. The combination according to claim 7 wherein said first lifting means are so coupled to said second lifting means that said elbow is lifting slightly farther than said furnace roof to provide clearance for removing said roof for maintenance and furnace-charging purposes.

9. The combination according to claim 8 wherein said first lifting means includes at least one lever pivoted to said roof supporting structure, the adjacent end of said lever being connected to said second lifting means for simultaneous movement thereby, said lever being pivoted beyond the midpoint thereof relative to the other end of said lever which is connected to said elbow so that said other end and said elbow are raised farther than said furnace roof.

10. The combination according to claim 1 wherein said elbow supporting structure is pivotally connected to each of said adjacent lever ends.

11. The combination according to claim 10 wherein said pivoted elbow supporting structure is connected through pantographic mechanism to said lever pivoting means to effect a controlled angular displacement of said supporting structure relative to said levers as the latter are pivoted.

12. The combination according to claim 1 wherein means are coupled to said lifting mechanism for adjustably juxtaposing said elbow to said fume opening to regulate the draft thereat.

References Cited

UNITED STATES PATENTS

| | | | |
|---|---|---|---|
| 3,115,336 | 12/1963 | Longenecker | 263—46 |
| 3,173,980 | 3/1965 | Hysinger | 266—34 |
| 3,379,426 | 4/1968 | Reuter et al. | 266—15 X |

U.S. Cl. X.R.

13—10; 266—34

JOHN J. CAMBY, *Primary Examiner.*

UNITED STATES PATENT OFFICE
CERTIFICATE OF CORRECTION

Patent No. 3,428,301                                                          February 18, 1969

Leslie A. Chermely

It is certified that error appears in the above identified patent and that said Letters Patent are hereby corrected as shown below:

In Figure 1 of the drawings, the upper edge of the ring 14 is now shown in dotted lines where it intersects the roof 18. The roof attachment of cables 20 is extended to show the attachment with the added dotted lines. The side walls of the furnace 12 are now shown in section in a location beneath the roof 18. In Figure 1A, the upper edge of ring 14 is shown in dotted lines where it intersects the roof 18 and the side walls of furnace 12 are now shown in section beneath the roof 18. The roof attachment of the cables 20 and 20a are shown in dotted attachment with the dotted upper edge of ring 14. In Figure 1B, the portion of the opening 16 and the erroneous showing of engaging ring 14 associated with the opening 16 is removed. The ring 14 is now properly shown in position at the edge of roof 18. The side walls of furnace 12 are shown in section beneath the upper opening 16. Column 4, line 6, "relative to it" should read -- in --; line 35, after "18" insert -- and 14 --; line 44, after "18" insert -- and 14 --. Column 5, line 35, "ring 14" should read -- ring 16 --; line 36, after "18" insert -- with 14 --; line 42, after "18" insert -- and 14 --; line 44, after "18" insert -- and 14 --; line 57, after "18" insert -- and 14 --; line 67, after "18" insert -- and 14 --. Column 6, line 4, after "18" insert -- and 14 --; line 21, cancel "or the upper edges of the furnace ring 14".

Signed and sealed this 17th day of November 1970.

(SEAL)
Attest:

EDWARD M. FLETCHER, JR.                              WILLIAM E. SCHUYLER, JR.
Attesting Officer                                               Commissioner of Patents